US006386147B1

(12) United States Patent
Fransen

(10) Patent No.: US 6,386,147 B1
(45) Date of Patent: May 14, 2002

(54) OPERATING CYLINDER

(75) Inventor: René Fransen, Vlaardingen (NL)

(73) Assignee: Maasland, N.V. (NL)

( * ) Notice: Subject to any disclaimer, the term of this patent is extended or adjusted under 35 U.S.C. 154(b) by 0 days.

(21) Appl. No.: 09/467,887

(22) Filed: Dec. 21, 1999

(30) Foreign Application Priority Data

Dec. 21, 1998 (NL) ........................................ 1010854

(51) Int. Cl.[7] ........................................ A01K 1/00
(52) U.S. Cl. ........................................ 119/524
(58) Field of Search ........................ 119/14.03, 14.04, 119/520, 524; 91/508, 533, 517, 518; 188/318, 313, 28.2

(56) References Cited

U.S. PATENT DOCUMENTS

| | | | | |
|---|---|---|---|---|
| 3,580,139 A | * | 5/1971 | Rasmussen | 91/510 |
| 3,894,477 A | | 7/1975 | Tomikawa | 91/355 |
| 3,921,586 A | * | 11/1975 | Sweeney et al. | 119/510 |
| 4,351,153 A | * | 9/1982 | Kosmala | 60/581 |
| 4,729,224 A | * | 3/1988 | McAteer | 60/593 |
| 4,763,605 A | * | 8/1988 | Braum | 119/14.03 |
| 4,770,205 A | * | 9/1988 | Jones et al. | 137/493.8 |
| 5,353,685 A | * | 10/1994 | Snow | 91/459 |

FOREIGN PATENT DOCUMENTS

| | | |
|---|---|---|
| DE | 3631844 A1 | 9/1986 |
| EP | 0548058 A2 | 6/1993 |
| FR | 2177060 | 11/1973 |
| NL | 1010854 | 12/1998 |

* cited by examiner

*Primary Examiner*—Peter M. Poon
*Assistant Examiner*—Son T. Nguyen
(74) *Attorney, Agent, or Firm*—Penrose Lucas Albright

(57) ABSTRACT

A piston and cylinder arrangement for opening and closing entrance or exit doors or both in a milking compartment of a fully automated milking system. The piston and cylinder arrangement comprises an elongated cylinder having two pistons connected in tandem to an elongated piston rod. The cylinder is hermetically divided into two cylindrical portions each containing one of the pistons. The piston acts against a liquid in one portion and in the other portion the piston is actuated by pneumatic pressure. The piston rod is extended through the end of the cylinder and is connected to open and close an entrance door. The cylindrical portion containing the liquid has the liquid on both sides of the piston connected by a check-valve and a by-pass valve. To block movement of the pistons, the by-pass valve is retained in a closed position by pneumatic pressure from a supply of pressurized gas for actuating the piston in the pneumatic side of the cylinder. The by-pass valve is a sliding valve urged into an open position by a compression spring when the valve is not closed by pneumatic pressure. Both the by-pass valve and the check valve are disposed external to the cylindrical housing.

17 Claims, 2 Drawing Sheets

OPERATING CYLINDER

FIELD OF THE INVENTION

The invention relates to a blocking device for an operating piston and cylinder arrangement wherein the piston rod selectively controls the closing of the entrance to and the exit from a milking compartment after an animal has entered to be milked.

BACKGROUND OF THE INVENTION

Such a cylinder and piston arrangements including blocking devices are disclosed in European application 0 548 058 of Van den Berg et al published Jun. 23, 1993.

This prior art application discloses a milking compartment with a milking robot, said milking compartment being provided with entrance and exit gates or doors. For opening the entrance door, a pneumatic operating piston and cylinder is provided. A pneumatic operating piston and cylinder is selected inasmuch as almost all the other pistons and cylinder arrangements for operating the milking robot arm are also pneumatically actuated and thus, a pneumatic operating system is available. A pneumatic operating piston and cylinder, in contrast with a comparable hydraulic operating piston and cylinder, provides less force. The above-mentioned milking compartment with a pneumatic operating piston and cylinder has the disadvantage that, when an animal leans against the entrance door, the pneumatic operating piston and cylinder is not capable of absorbing the force so exerted, unless a large pneumatic piston and cylinder is used. In the milking compartment according to European application this problem is solved in that on the entrance door a rack with a ratchet is disposed which acts as a blockage device when the animal pushes against the entrance door.

This arrangement, however, has the disadvantage of not being compact and that the operating piston cylinder and the rack with ratchet operate separately.

SUMMARY OF THE INVENTION

An object of the invention is to provide an operating piston and cylinder for the entrance and for the exit doors of a milking compartment which is compact and is relatively simple to operate.

In accordance with the invention, this is achieved by providing operating piston and cylinder with a blocking device for blocking movement of the piston rod in at least one direction, said blocking device being provided with activating means which comprises a third operating entrance into the cylinder which can be connected to conventional first or second operating cylinder entrances or to both, to place the activating means into operation. Because the blocking device is integrated in the operating piston and cylinder and the activating means are connectable to each other, the result is a compact and easily operable operating piston and cylinder that includes a blocking device.

According to an inventive feature, a fluid connection between the third operating entrance and the first or the second operating entrances or both, is effected by mechanical or electric or pneumatic or hydraulic controls. Therefore, it is possible to activate the piston and cylinder and the blocking device mechanically or electrically or pneumatically or hydraulically by means of a control signal. For the purpose of obtaining a compact construction, according to an inventive feature, the blocking device comprises a second piston provided within the cylindrical housing, which second piston is received on the same piston rod whereby the housing is divided by the two pistons into first, second, third and fourth chambers, said third and fourth chambers being provided with a fourth and fifth operating entrances, respectively. In accordance with a further inventive feature, the activating means comprise passage means connecting the third and fourth chambers that permits a fluid flow in only one direction between the third and fourth chambers. According to again another aspect of the invention, such passage means are included in the second piston or in a pipe connected to the fourth and fifth operating entrances, or in both. In a preferred embodiment of the invention, the passage means include a check or non-return valve. According to again another inventive feature, the activating means comprise a sliding valve. In a preferred embodiment of the invention, the sliding valve is activated pneumatically, but it is well within the skill of the art that the sliding valve may be activated a different manner, such as electrically or hydraulically. For the purpose of activating the sliding valve from one side, according to an inventive feature, the sliding valve comprises a return or drawback spring. In a preferred embodiment of the invention, the sliding valve is constituted by a 2/2-valve with a one-way connection and two closed gates. According to again another inventive feature, the first and second chambers may be filled with a gas, such as air, while the third and fourth chambers may be filled with a liquid, such as oil.

The invention also relates to a milking compartment which comprises a framework including an entrance door and an exit door, said entrance door or exit door or both, being provided with an operating piston and cylinder as described above. According to a further inventive feature, the milking compartment comprises a milking robot for automatically connecting teat cups to the teats of an animal to be milked.

BRIEF DESCRIPTION OF THE DRAWING

To understand the invention in the further detail, the invention will be described with reference to the accompanying drawing wherein.

DETAILED DESCRIPTION OF THE PREFERRED EMBODIMENTS

Figure 1:
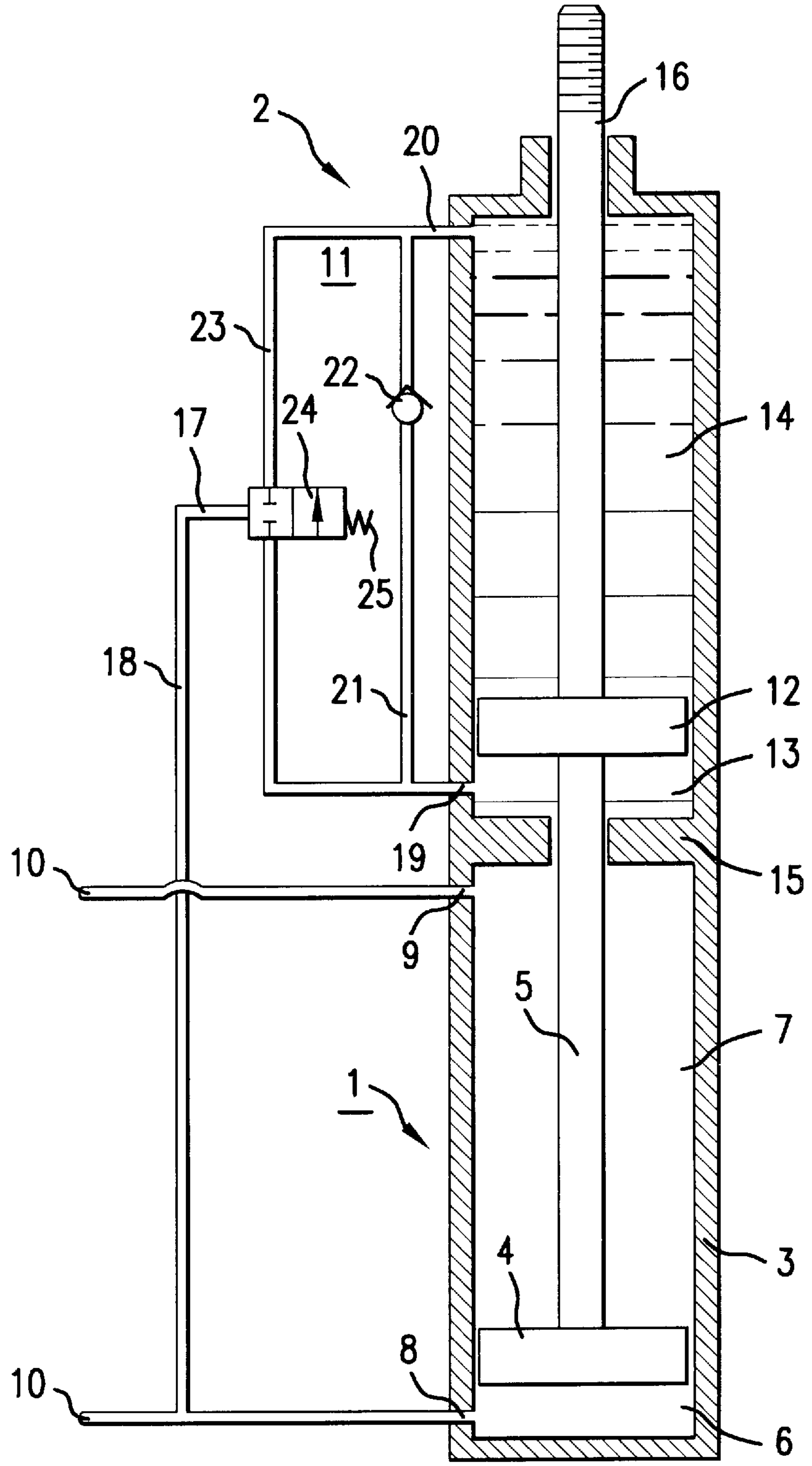
FIG. 1 is a cross-sectional view of an operating piston and cylinder with a blocking device.

A cross-section of an operating piston and cylinder 1 with a blocking device 2 in accordance with the invention is shown in FIG. 1. The operating piston and cylinder 1 comprises a cylindrical housing 3 which receives a first piston 4 with a piston rod 5. First piston 4 slidable engages the walls of housing 3 and divides housing 3 into a first chamber 6 and a second chamber 7.

First chamber 6 and second chamber 7 are provided with a first operating entrance 8 and a second operating entrance 9, respectively. Connected to such entrances 8 and 9 are pipes 10 which, in the present embodiment, are connected with a pneumatic operating system. Of course, instead of a pneumatic operating system any other similar operating system, such as a hydraulic operating system, may be used.

For the purpose of being activated, blocking device 2 comprises an activating means designated generally by reference numeral 11. Blocking device 2 further comprises a second piston 12 slideably engaging the walls of housing 3, which second piston 12 is disposed on the piston rod 5 and further divides housing 3 into a third chamber 13 and a fourth chamber 14. In housing 3 a partition 15 is provided which separates blocking device 2 from the other part of the operating piston and cylinder 1. Piston rod 5 is movable relative to partition 15 with its end 16 extending outwardly from housing 3. Activating means 11 comprise a third operating entrance 17 which, in the present embodiment, is connected via a pipe 18 with the lower pipe 10 of first operating entrance 8. Third chamber 13 and fourth chamber 14 comprise a fourth operating entrance 19 and a fifth operating entrance 20, respectively. Between fourth operating entrance 19 and fifth operating entrance 20 a first pipe 21 is arranged which defines passage means 21, said passage means only admitting a flow of fluid from third chamber 13 to fourth chamber 14 in one direction of flow. In the present embodiment, the passage means 21 comprises a check or non-return valve 22. Non-return valve 22 allows the liquid, in this situation oil, to flow from fourth chamber 14 to third chamber 13. Parallel to passage means 21 (comprising first pipe 21) is a second pipe 23 in which a sliding valve 24 is included. To the sliding valve 24, third operating entrance 17 is connected. Sliding valve 24 is provided with a return or drawback spring 25. In the present embodiment the drawback spring 25 is constituted by a compression spring. Sliding valve 24 is constituted by a 2/2-valve with a one-way connection and two closed gates.

Operating piston and cylinder 1 operates as follows:

When operating piston and cylinder 1 is provided for control of an entrance gate of a milking compartment, it is possible to control the opening of that gate by applying fluid pressure on lower pipe 10 in FIG. 1. Because pressure is applied on lower pipe 10, and thus first chamber 6, first piston 4 is moved upwardly so that piston rod 5 projects outwardly from housing 3. Further when a control signal is transferred via lower pipe 10, pipe 18 and third operating entrance 17 to sliding valve 24, blocking means 2 are activated. Sliding valve 24 is moved to the right by air pressure against the resilience of spring 25, so that sliding valve 24 assumes the position shown in FIG. 1. In said position, second pipe 23 is closed off so that oil is only allowed to flow from fourth chamber 14 to third chamber 13 via non-return valve 22 and pipe 21. As a result an attempt to push piston rod 5 back into housing 3 will not be successful because it is not possible for the oil to flow from third chamber 13 to fourth chamber 14. In this manner operating piston and cylinder 1 is blocked. When the pressure on lower pipe 10 is removed and pressure is applied on upper pipe 10, piston rod 5 will move in housing 3 and sliding valve 24 is urged to the left by drawback spring 25, to provide a connection between third chamber 13 and fourth chamber 14. As a result thereof the oil may flow freely from third chamber 13 to fourth chamber 14 and blocking device 2 is inoperative.

Figure 2:
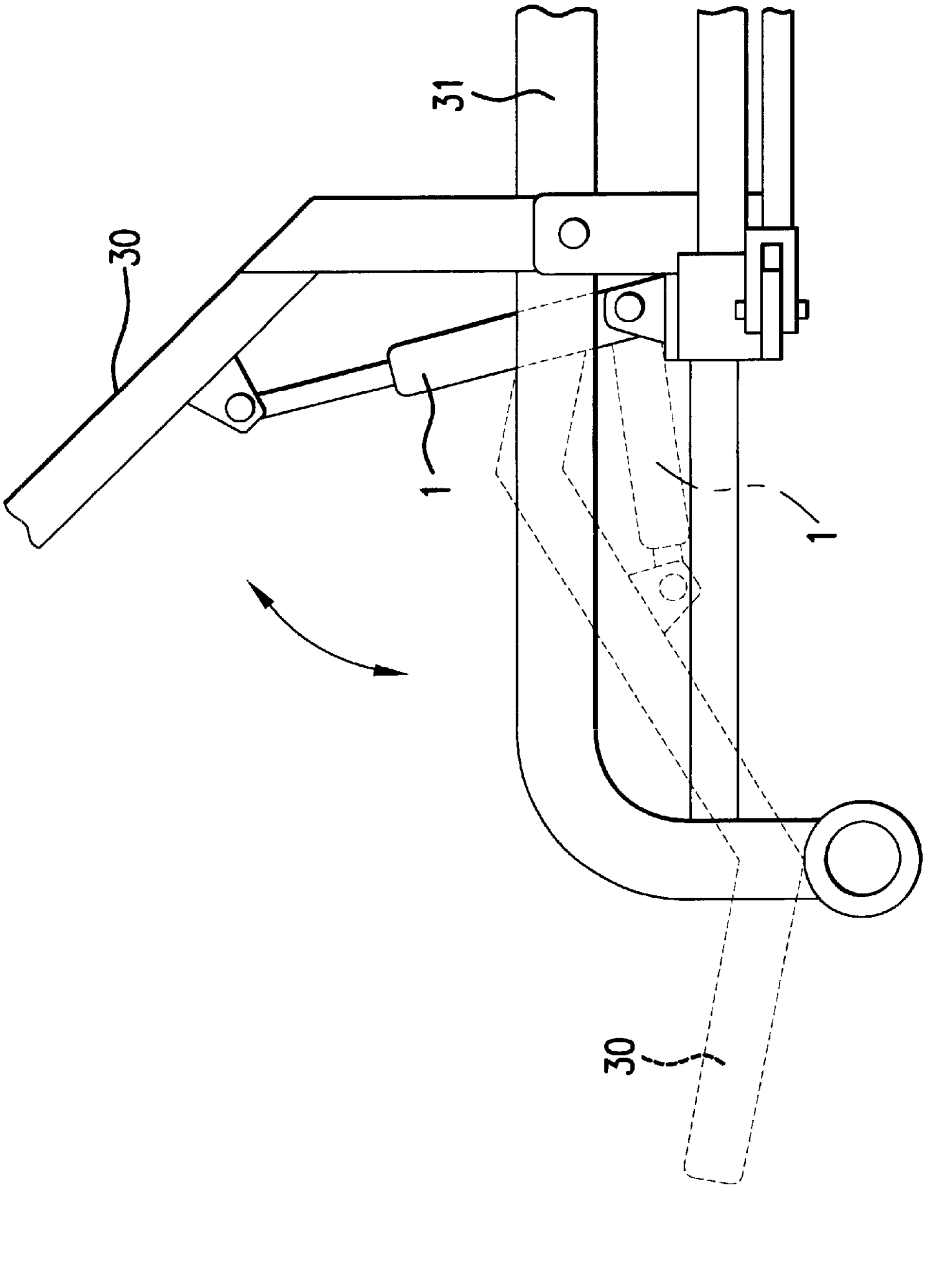
FIG. 2 is fragmentary plan view which illustrates the operating piston and cylinder in accordance with the invention arranged to open and close a door of a milking compartment comprising a framework and having a rear door.

FIG. 2 illustrates the use of piston and cylinder 1 to open and close the rear door 30 of a milking compartment 31. Only part of the door 30 is shown in FIG. 2 together with the framework of a milking compartment, represented by reference numeral 31. As shown in FIG. 2 rear door 30 is retained in a closed position by piston and cylinder 1. Its open position is shown in dashed lines in FIG. 2.

Although I have disclosed the preferred embodiment of my invention, it is to be understood that it is capable of other adaptations and modifications within the scope of the appended claims:

What is claimed is:

1. An operating piston and cylinder arrangement which comprises a housing, a first piston including a piston rod, said first piston being movable in and engaging a wall of said housing, said first piston dividing said housing into a first chamber and a second chamber, said first chamber and said second chamber having a first operating entrance and a second operating entrance, a fluid supply from which fluid can be selectively supplied to said first chamber and said second chamber and can be discharged therefrom into said first operating entrance and into said second operating chamber, a blocking device for blocking said piston rod in one direction, said blocking device comprising activating means which comprise a third operating entrance which can be selectively connected to said first operating entrance or said second operating entrance or both by said activating means.

2. An operating piston and cylinder arrangement in accordance with claim 1, wherein said selective connection between said third operating entrance and said first operating entrance or said second operating entrance, or both is activated by one of the following activating means: a mechanical means, or an electrical means or a pneumatic means or a hydraulic means.

3. An operating piston and cylinder arrangement in accordance with claim 2, wherein said blocking device comprises a second piston engaging said wall of said housing, said second piston being disposed on said piston rod and dividing said housing into a third chamber and a fourth chamber, said third chamber and said fourth chamber having a fourth operating entrance and a fifth operating entrance, respectively.

4. An operating piston and cylinder arrangement in accordance with claim 3, wherein said activating means comprise passage means which permits one way flow between said third and said fourth chamber.

5. An operating piston and cylinder arrangement in accordance with claim 4, wherein said passage means comprises a pipe which said fourth operating entrance and said fifth operating entrance.

6. An operating piston and cylinder arrangement in accordance with claim 4 wherein said passage means comprise a non-return valve.

7. An operating piston and cylinder arrangement in accordance with claim 6, wherein said activating means comprise a sliding valve.

8. An operating piston and cylinder arrangement in accordance with claim 7, wherein said sliding valve comprises a compression spring.

9. An operating piston and cylinder arrangement in accordance with claim 7 wherein said sliding valve comprises a 2/2 valve having a one-way connection and two closed gates.

10. An operating piston and cylinder arrangement in accordance with claim 1, wherein said first chamber and said second chamber are filed with a gas, and said third chamber and said fourth chamber are filed with a liquid.

11. A milking compartment for milking animals which comprises a framework for confining the animal to be milked, a door in said framework for the admission of said animal into the milking compartment, an operating piston and cylinder arrangement that controls the opening and closing of said door, said arrangement comprising a cylindrical housing, a first piston including a piston rod engagingly received in said housing and being moveable therein, said piston dividing said housing into a first chamber and a second chamber, said first chamber and said second chamber each having an operating opening, a fluid supply connected to at least one of said openings for urging said first piston to move in said housing in a first direction, a blocking device for blocking said piston from moving in a second direction opposite to said first direction, said blocking device comprising activating means which comprise a third operating opening which can be selectively connected to said first operating opening or said second operating opening or to both, said activating means selectively activating and deactivating said blocking device.

12. A milking compartment for milking animals in accordance with claim 11 which comprises a milking robot for automatically connecting teat cups to the teats of an animal to be milked when said blocking device is activated.

13. A milking compartment for milking animals in accordance with claim 12 wherein said housing comprises a third chamber and a fourth chamber with a second piston connected to said first piston, said second piston dividing said third chamber from said fourth chamber, said first chamber and said second chamber containing a gas, said third chamber and said fourth chamber containing a liquid, said activating means comprising two liquid passages between said third chamber and said fourth chamber, one of said liquid passages including a check valve and other of said liquid passages comprising a by-pass valve and means for selectively opening and closing said by-pass valve, a supply of gas under pressure other than ambient pressure connected to said first said chamber or said second chamber for selectively causing said first piston together with said second piston to move in said housing subject to the opened or closed status of said by-pass valve.

14. A milking compartment for milking animals in accordance with claim 13 wherein said gas comprises air and said liquid comprises oil.

15. A milking compartment for milking animals in accordance with claim 14 wherein said check valve and said by-pass valve are located externally relative to said housing.

16. A milking compartment for milking animals in accordance with claim 15 wherein said gas supply is connected to said by-pass valve selectively to retain said by-pass valve in a closed position, resilient means connected to said by-pass valve to open said by-pass valve when it is not being retained in a closed status by said gas supply.

17. A milking compartment for milking animals in accordance with claim 16 wherein said resilient means comprises a compression spring.

* * * * *